United States Patent
Butler, Jr. et al.

(10) Patent No.: US 6,615,645 B1
(45) Date of Patent: Sep. 9, 2003

(54) SYSTEM AND METHOD FOR GENERATING A KNOCK DETERMINATION WINDOW FOR AN ION CURRENT SENSING SYSTEM

(75) Inventors: Raymond O. Butler, Jr., Anderson, IN (US); Ronald J. Kiess, Decatur, IN (US); Daniel J. O'Connor, Westfield, IN (US); Max W Ellis, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/200,629

(22) Filed: Jul. 22, 2002

(51) Int. Cl.[7] ............................ G01L 3/26; F02P 5/00
(52) U.S. Cl. ........................... 73/117.3; 123/406.16; 123/406.14
(58) Field of Search .................. 73/35.08, 117.3; 123/406.11, 406.12, 406.13, 406.14, 406.16, 406.24, 406.25, 406.26, 406.27, 406.29, 406.37; 324/378, 393, 399

(56) References Cited

U.S. PATENT DOCUMENTS

| | | | |
|---|---|---|---|
| 5,534,781 A | 7/1996 | Lee et al. | 324/380 |
| 5,537,855 A | 7/1996 | Hunninghaus et al. | 73/35.05 |
| 5,781,012 A * | 7/1998 | Yasuda | 324/399 |
| 5,954,024 A * | 9/1999 | Duhr et al. | 123/310 |
| 6,089,077 A | 7/2000 | Daniels | 73/35.08 |
| 6,338,267 B1 | 1/2002 | Karau | 73/35.03 |

* cited by examiner

Primary Examiner—Richard A. Moller
(74) Attorney, Agent, or Firm—Margaret A. Dobrowitsky

(57) ABSTRACT

An ignition apparatus including a primary and a secondary winding for producing a spark voltage, an ion current detection circuit for producing an ion current signal, a slope detector and a knock detector. The slope detector determines when the ion current signal exhibits a slope indicative of a time period when knock is likely to occur, and de-asserts a knock reset signal. The knock reset signal holds the knock detector in reset, thus disallowing or masking the processing of signals by the knock detector that may be mistaken for knock.

13 Claims, 5 Drawing Sheets

SYSTEM AND METHOD FOR GENERATING A KNOCK DETERMINATION WINDOW FOR AN ION CURRENT SENSING SYSTEM

BACKGROUND OF THE INVENTION

1. Technical Field

This invention relates generally to a system and method for determining knock in an ion current sensing system of the type useful in connection with controlling ignition in an internal combustion engine.

2. Description of the Related Art

One approach for detecting a combustion condition, such as knock or misfire, involves the use of a so-called ion sense system. It is known that the combustion of an air/fuel mixture in an engine results in molecules in the cylinder being ionized. It is further known to apply a relatively high voltage across, for example, the electrodes of a spark plug just after ignition in order to produce a current between the electrodes. Such current is known as an ion current. The ion current that flows is, generally speaking, proportional to the number of combustion ions present in the area of, for example, the spark plug gap referred to above. Additionally, the level of such ion current may provide some measure of the level of ionization throughout the entire cylinder as combustion occurs. The DC level or amount of ion current is indicative of the quality of the combustion event, or whether in fact combustion has occurred at all (e.g., a misfire condition). An AC component of the ion current may be processed to determine the presence of knock.

It is also known to determine knock which involves processing a signal from a knock sensor only during a so-called knock window, as seen by reference to U.S. Pat. No. 5,537,855 issued to Hunninghaus et al. entitled "KNOCK DETECTION METHOD AND APPARATUS WITH DUAL INTEGRATION WINDOWS." Hunninghaus et al. discloses a knock sensor having an output that is processed during dual knock windows. The knock signal from the sensor is processed during one angular window or period (i.e., produced by a controller based on a crank position sensor) at a point in an engine combustion cycle where a knock event is expected to occur. A shortcoming of this approach, whether using a conventional knock sensor or using an ion sense system, is that such a knock window constitutes, at best, only a prediction by the controller as to when the knock is going to occur. There is therefore a margin for error with controller-generated knock windows, which may permit processing of information that may be mistaken for knock (e.g., noise), resulting in a false indication of knock by the knock detection system.

U.S. Pat No. 6,089,077 issued to Daniels entitled "MASS FRACTION BURNED AND PRESSURE ESTIMATION THROUGH SPARK PLUG ION SENSING" discloses an ion sensing system. The system of Daniels further discloses determining an inflection point in the ion signal and calculating a mass fraction on that basis.

There is therefore a need to provide an improved apparatus for detecting a combustion condition, such as knock, that minimizes or eliminates one or more of the shortcomings as set forth above.

SUMMARY OF THE INVENTION

One object of the present invention is to provide a solution to one or more of the above-identified problems. One advantage of the present invention is that it permits internal generation of a knock window (i.e., internal to an ignition coil configured with the invention), thereby eliminating the need for an engine controller or the like to generate a knock window, with all its disadvantages as described in the Background. Another advantage is that the internally generated knock window is superior to a controller-generated knock window inasmuch as it is generated based on real data, not a guess based on crank angular position. This improvement yields a more accurate knock intensity signal. In an alternate embodiment, the knock signal (e.g., indicative of knock intensity) is sent to the engine controller over an ignition control signal line (i.e., the same line that carries the signal for controlling dwell and spark timing to the ignition coil). This multiplexing of the two signals on one physical line allows for the elimination of one wire from the overall system, decreasing cost and improving reliability.

These and other objects, features and advantages are realized by a method and apparatus according to the invention that operates based on detection of the slope of the ion current signal. The knock signal occurs on the last decreasing voltage portion of the ion current signal waveform for each ignition event. Processing the ion current signal for knock only during this time (i.e., the defined knock window) will reduce much of the noise that may be mistaken for knock in prior, conventional systems.

An apparatus according to the present invention includes an ion current detection circuit, a knock detector, and a slope detector. The ion current detection circuit is configured to bias a spark plug in an engine cylinder for producing an ion current signal indicative of a level of combustion in the cylinder. The ion current signal includes knock components when knock is present in the cylinder. The knock detector is enabled during a knock window for generating a knock signal that is indicative of knock in the cylinder, based on the ion current signal. The slope detector is configured to enable the knock detector when the ion current signal exhibits a predetermined slope indicative of a time interval over which knock is to occur.

A method of detecting knock is also presented.

Other objects, features and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
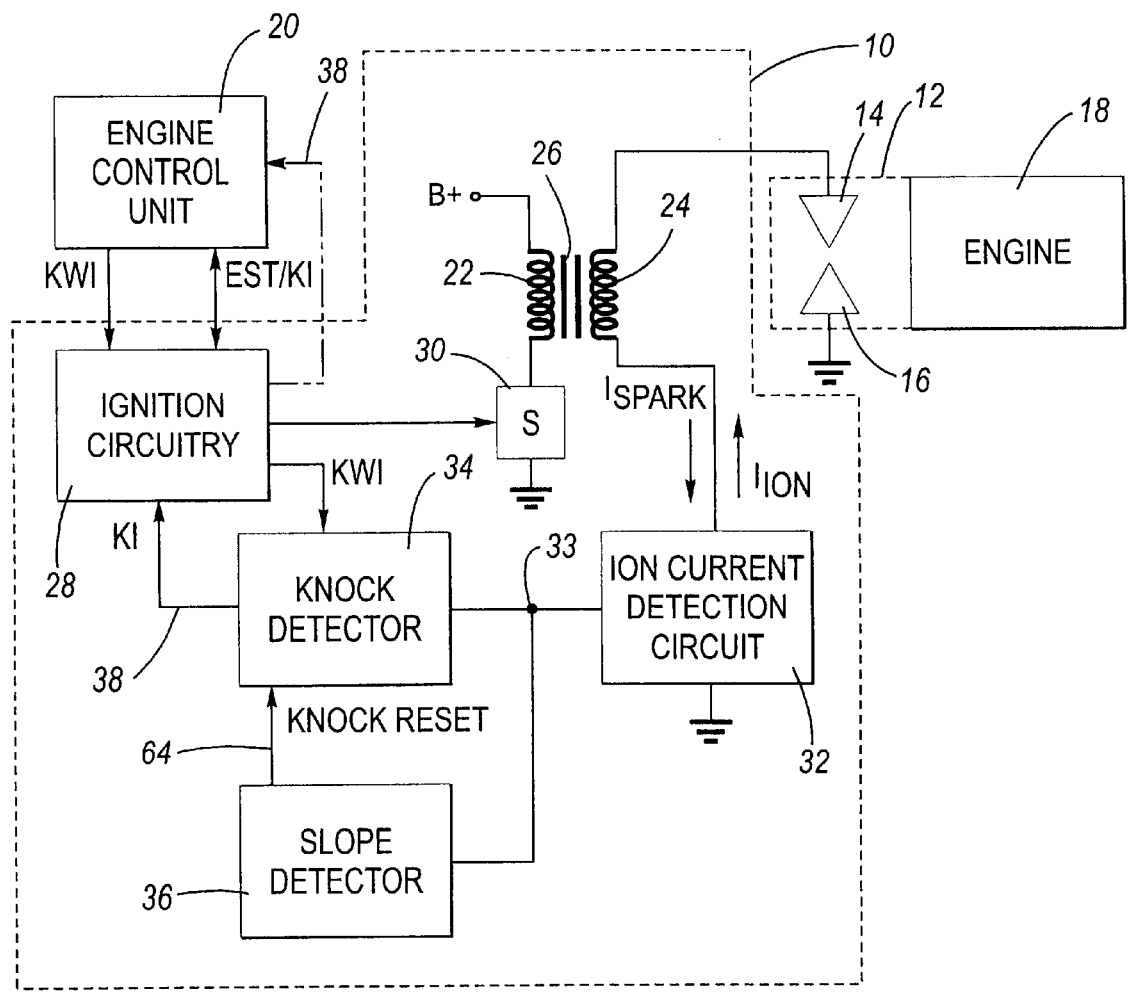
FIG. 1 is a simplified diagrammatic and schematic view of an ignition system for an internal combustion engine including a slope detector and knock detector according to the invention.

Referring now to the drawings wherein like reference numerals are used to identify identical components in the various views, FIG. 1 is a simplified schematic and block diagram view of an ignition apparatus 10 having an improved knock window for an ion sense system according to the invention. Ignition apparatus 10 includes an ion current sensing capability and is adapted for installation to a conventional spark plug 12 having spaced electrodes 14 and 16 received in a spark plug opening of an internal combustion engine 18. As known, the electrodes of spark plug 12 are proximate a combustion cylinder of engine 18. FIG. 1 also shows an engine control unit (ECU) 20.

Apparatus 10 further includes a primary winding 22, a secondary winding 24, a core 26, ignition circuitry 28, a primary switch 30, an ion current detection circuit 32 generating an ion current signal 33, a knock detector 34, and an ion current signal slope detector 36. The knock detector 34 generates a knock signal, which may be a knock intensity (KI) signal 38.

Generally, overall spark timing (dwell control) is provided by engine control unit (ECU) 20 through generation of an ignition control signal, shown as an electronic spark timing (EST) signal. Control unit 20, in addition to spark control, may also control fuel delivery, air control and the like. In a global sense, control unit 20 is configured to control overall combustion in engine 18. Control unit 20 may include, for example, a central processing unit (CPU), memory, and input/output, all operating according to pre-programmed strategies. ECU 20 may adjust the fuel/air mixture and/or spark timing (e.g., retard spark) in response to knock intensity signal 38. Techniques for responding to knock are well known in the art.

In addition, in a first embodiment, engine control unit 20 may be configured to provide a calculated knock window signal, designated KWI (i.e., start, end, and duration), which endures for the time period in which ECU 20 expects knock to occur. The knock window is defined so as to facilitate knock detection. Approaches for the generation of the knock window are known in the art (e.g., determined generally based on the engine position or range of positions in which knock is most likely to occur, for example, 10–15 engine degrees after top dead center (TDC)). Alternatively, if a knock window signal (KWI) is not provided by engine control unit 20, ignition circuitry 28 may be configured to generate a knock window on its own for use by knock detector 34, for example, as described in copending application entitled "IGNITION COIL INTEGRATED ION SENSE WITH COMBUSTION AND KNOCK OUTPUTS," U.S. application Ser. No. 10/091,247, filed on Mar. 4, 2002, attorney Docket No. DP-304,842, assigned to the common assignee of the present invention, and hereby incorporated by reference in its entirety.

FIG. 1 also shows that, in a preferred embodiment, the EST signal and KI signal 38 are multiplexed on the same physical connection between ECU 20 and ignition apparatus 10. As will be described in greater detail below, this sharing is done in a time division multiplexed manner (i.e., the same line is bidirectional). This multiplexing may be implemented by including tristate circuitry in ignition circuitry 28, so as to allow input of the EST signal during a first phase, while allowing generation of the KI signal 38 during a second phase distinct from the first phase. This feature allows elimination of a physical wire or connection between the ECU 20 and the ignition apparatus 10, thereby reducing cost and improving reliability. In an alternate embodiment, the knock intensity KI signal 38 may be provided to the ECU 20 via a separate line, as shown in phantom-line format in FIG. 1.

A high side end of primary winding 22 may be connected to a supply voltage provided by a power supply, such as a vehicle battery (not shown) hereinafter designated "B+" in the drawings. Supply voltage B+ may nominally be approximately 12 volts. A second end of the primary winding opposite the high side end is connected to switch 30. The high voltage end of secondary winding 24 is coupled to spark plug 12. The opposite end of secondary winding 24 is connected to ion current detection circuit 32.

Ignition circuitry 28 is configured to selectively connect, by way of switch 30, primary winding 22 to ground based on the electronic spark timing (EST) signal, for example, provided by engine control unit 20. Such connection, as is generally known in the art, will cause a primary current $I_p$ to flow through the primary winding 22. Switch 30 may comprise conventional components, for example, a bipolar transistor, a MOSFET transistor, or an insulated gate bipolar transistor. Ignition circuitry 28 may be configured to provide additional-functions, for example, applying repetitive sparks to the combustion chamber during a single combustion event. During the spark event, a spark current, designated $I_{SPARK}$, flows across spaced electrodes 16, 14. In addition, spark plug 12 is configured so that when biased by a relatively high voltage produced by ion current detection circuit 32, an ion current may be carried across electrodes 14, 16.

In the figures, the ion current is designated $I_{ION}$. The magnitude of a DC component of the ion current is indicative of a combustion condition, such as combustion, and/or misfire. In particular, as is known, the greater the ion current (i.e., due to more ionized molecules present in the cylinder), the greater the combustion. In addition, the presence of an AC component of the ion current is indicative of a knock condition. A first knock mode may be defined based on the magnitude of the AC component of the ion current in a range between approximately 5–6 kHz. Alternatively, a second knock mode may be defined based on a magnitude of the AC component of the ion current in a range between approximately 10–12 kHz. It has been observed that knock will most likely start at the peak of the ion current, which may be from about 10–15 engine degrees, more preferably about 14–15 engine degrees after TDC.

Ion current detection circuit 32 is configured to perform multiple functions. First, circuit 32 is configured to establish a bias voltage across electrodes 14, 16 for causing an ion current to flow. The structure for performing this function may include any one of a plurality of approaches known in the art. In one embodiment, a zener diode is employed in parallel with the storage capacitor; however, this is exemplary only and not limiting in nature. Circuit 32 is further configured to provide the means for sensing the ion current and for generating in response thereto an ion current signal 33.

Knock detector 34 is configured generally, when enabled during a knock window KWI, to generate a knock signal 38 indicative of knock in the cylinder associated with the ion current being sensed. In the illustrated embodiment, knock detector 34 has a knock reset signal 64 applied to an enable input. When the knock reset signal is asserted (e.g., a logic high in one embodiment), the knock detector 34 is held in reset and no processing is allowed to occur. However, when the knock reset signal is de-asserted (e.g., a logic low), knock detector 34 is enabled to determine knock. In one embodiment, the knock signal 38 may be a knock intensity signal indicative of the intensity of knock (as detected). Knock detector 34 may comprise various structures and functions for detecting knock known in the art. For example, in one embodiment, knock detector 34 is configured to include a filter to extract knock components from the ion current signal, a rectifier circuit to rectify the knock components and an integrator (i.e., either analog or digital) for integrating the rectified knock components contained in the ion current signal. In such an embodiment, the integrator is held in reset while the knock reset signal is asserted, and is thereafter allowed to perform its integration function when the knock reset signal is deasserted.

Slope detector 36 is configured to detect when the ion current signal 33 exhibits a predetermined slope indicative of a time period during which knock is expected to occur, and enable knock detector 34 to generate the knock intensity KI signal 38. In the illustrated embodiment, slope detector 36 is configured to generate a knock reset signal and provide it to knock detector 34. During the time interval when the slope of the ion current signal indicates that knock is unlikely to occur, then slope detector 36 asserts the knock reset signal in order to hold the knock detector 34 in reset (i.e., unable to detect noise and the like that may be mistaken for knock). However, during the time interval when the slope of the ion current signal indicates that knock is likely to occur, then the slope detector 36 de-asserts the knock reset signal.

In the arrangement of FIG. 1, the ion current is flowing from ground up through ion current detection circuit 32, and it therefore has a negative voltage polarity in its native state. With regard to an ion current signal inverted from its native state, the last decreasing-slope voltage portion represents the interval where slope is likely to occur. Knock is unlikely to occur in the immediately preceding positive slope portion of the inverted ion current signal. This lifting of the knock reset signal allows the knock detector 34 to operate for detecting knock components (if present) and generating the knock intensity signal 38. It should also be appreciated that since the knock detector 34 is held in reset when knock is not likely to occur, noise or the like masquerading as knock components and occurring temporally outside the desired knock interval, will be rejected. For integration-based knock detectors, such components will not be accumulated. This rejection will minimize or eliminate false indications of knock.

It should also be specifically understood that the foregoing polarity sense and logic sense of the signal output by slope detector 36 is exemplary only. For example, slope detector 36 may be configured to assert an enable (rather than a reset) signal when the slope indicates that knock is likely, and use this enable signal to directly enable the slope detector to operate.

Figure 2:
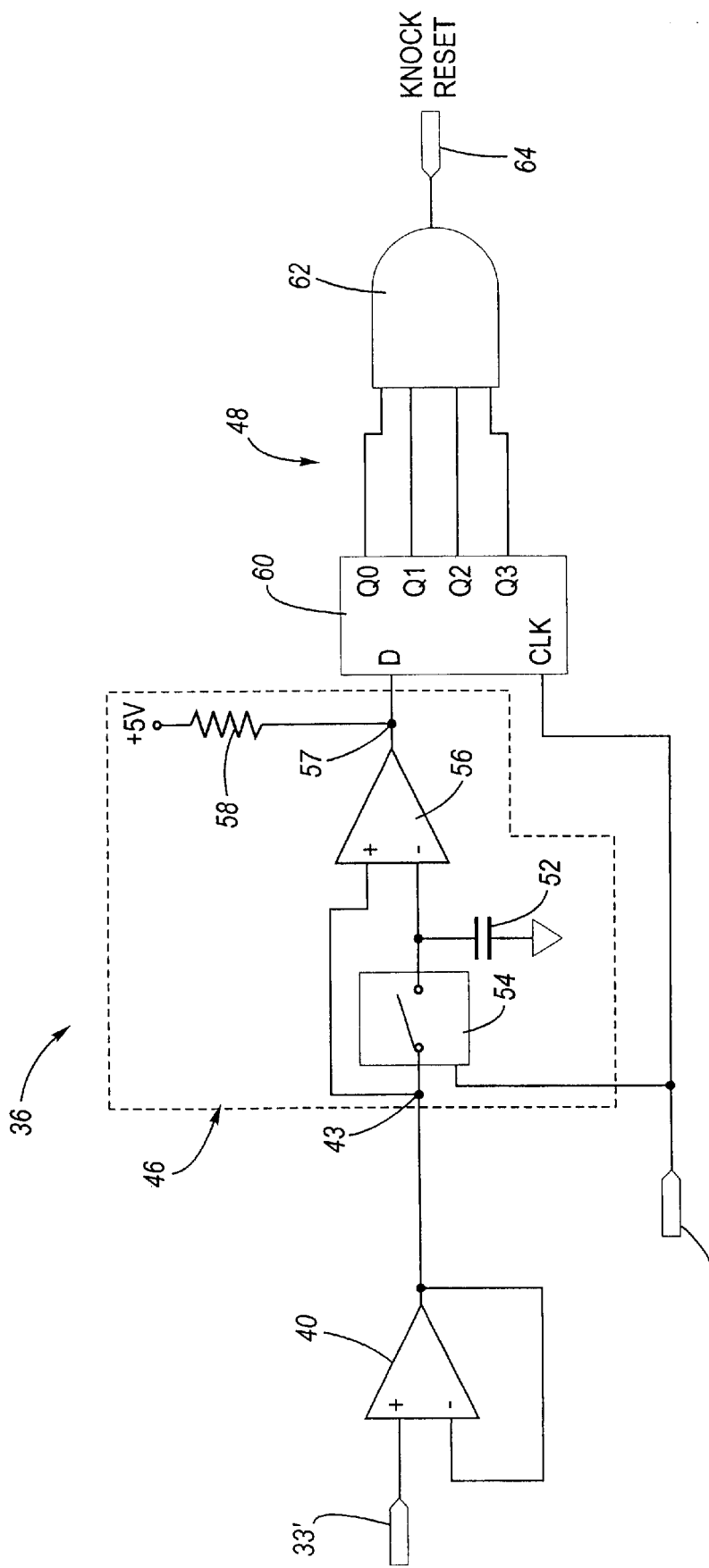
FIG. 2 shows, in greater detail, the slope detector of FIG. 1.

FIG. 2 shows slope detector 36 in greater detail. Slope detector 36 includes an amplifier 40, resistor 42, a capacitor 44, a sample and hold circuit 46, an output logic circuit 48 and a clock input 50.

Figure 4:
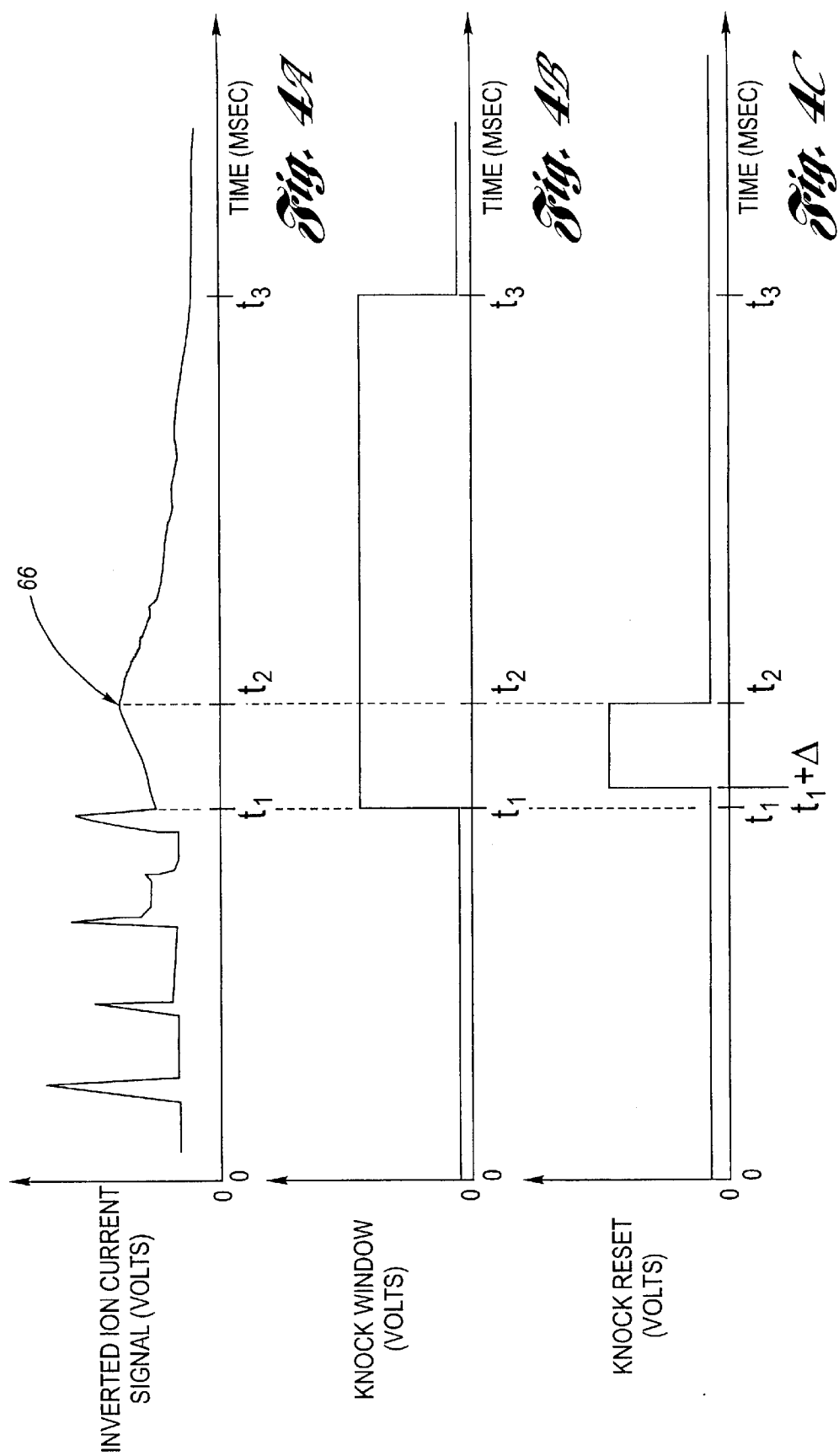
FIGS. 4A–4C are simplified timing diagrams showing, an ion current signal, a knock window, and a knock reset signal of FIGS. 3A–3N in greater detail.

Amplifier 40 includes an inverting input terminal configured to receive a buffered and inverted version of the ion current signal 33, designated 33' in FIG. 2 (and is best shown in FIG. 4A). Amplifier 40 further includes an output terminal that is fed back to a non-inverting input terminal of amplifier 40.

Sample and hold circuit 46 is responsive to a clock signal on input 50 for capturing and holding the prevailing level of the ion current signal at each cycle of the clock signal. Circuit 46 includes a sample capacitor 52, an analog switch 54, a comparator 56 and a pullup resistor 58.

Switch 54 is configured to open and close with each cycle of the clock signal on clock input 50. When switch 54 is closed, it passes the signal on node 43, which is then applied to capacitor 52. Capacitor 52 is charged to that voltage level of node 43 ($V_{43}$). When the clock signal changes state, switch 54 opens, thereby leaving the applied voltage level ($V_{43}$) on capacitor 52. This level is then held, at least until the next clock cycle.

Comparator 56 is configured to produce a slope indicative signal on an output node 57. The sampled voltage level ($V_{43}$) being held on capacitor 52 is provided to the inverting input terminal of comparator 56. The non-inverting input terminal of comparator 56, however, tracks (in substantial real-time) the voltage level on node 43. Depending on whether the real-time signal is higher or lower than the sampled voltage will determine whether the slope is positive or negative. When the real-time signal at the non-inverting input terminal of comparator 56 is higher than the sampled signal on the inverting input terminal of comparator 56 (i.e., indicative of a positive slope), then the comparator 56 produces a logic high output (i.e., its output is allowed to be pulled high via pullup resistor 58). However, when the real-time signal is lower than the sampled signal (i.e., indicative of negative slope), then the comparator 56 produces a logic low output. The slope indicative signal on node 57 (i.e., either "0" or "1") is then provided to logic circuit 48.

Logic circuit 48 is responsive to the clock signal and the slope indicative signal and is configured to produce the knock reset signal 64. Logic circuit 48 includes a shift register 60 and an AND logic gate 62.

Shift register 60 is configured to have a predetermined number of outputs corresponding to the number of stages included in shift register 60. Shift register 60 is responsive to the clock signal to "clock in" the slope indicative signal provided to its data ("D") input terminal (i.e., clock in either a logic "0" or a logic "1"), which is then output at output Q0. As known, with each clock cycle a new value for Q0 is clocked-in, and existing values for any particular stage are shifted "up" one stage. For example, the value in Q0 is shifted to Q1, the value in Q1 is shifted to Q2 and so on. The value in Q3 is discarded in the illustrated embodiment.

The shift register 60 starts with all its ouputs Q0, Q1, Q2, Q3 equal to zero. Thus, AND gate 62 initially produces a logic low (zero). However, when the input ion current signal 33 exhibits a positive slope for four (4) consecutive clock cycles, then the shift register 60 will have all its stages filled with logic "1" s, wherein all its outputs Q0, Q1, Q2, Q3 will produce a logic high. On the happening of this condition, AND gate 62 will output a logic high signal. That is, the knock reset signal will be asserted (i.e., become a logic high). It should be understood that the foregoing description of one embodiment of a digital slope detector is exemplary only and not limiting in nature. There are a wide variety of possible implementations using digital components to achieve the foregoing functionality. Moreover, slope detector 36 could also be implemented in purely analog form, or even in software using a controller coupled to sampled values.

Referring now to FIGS. 3A–3N and FIGS. 4A–4C, a description of the operation of the present invention will now be set forth.

Figure 3:
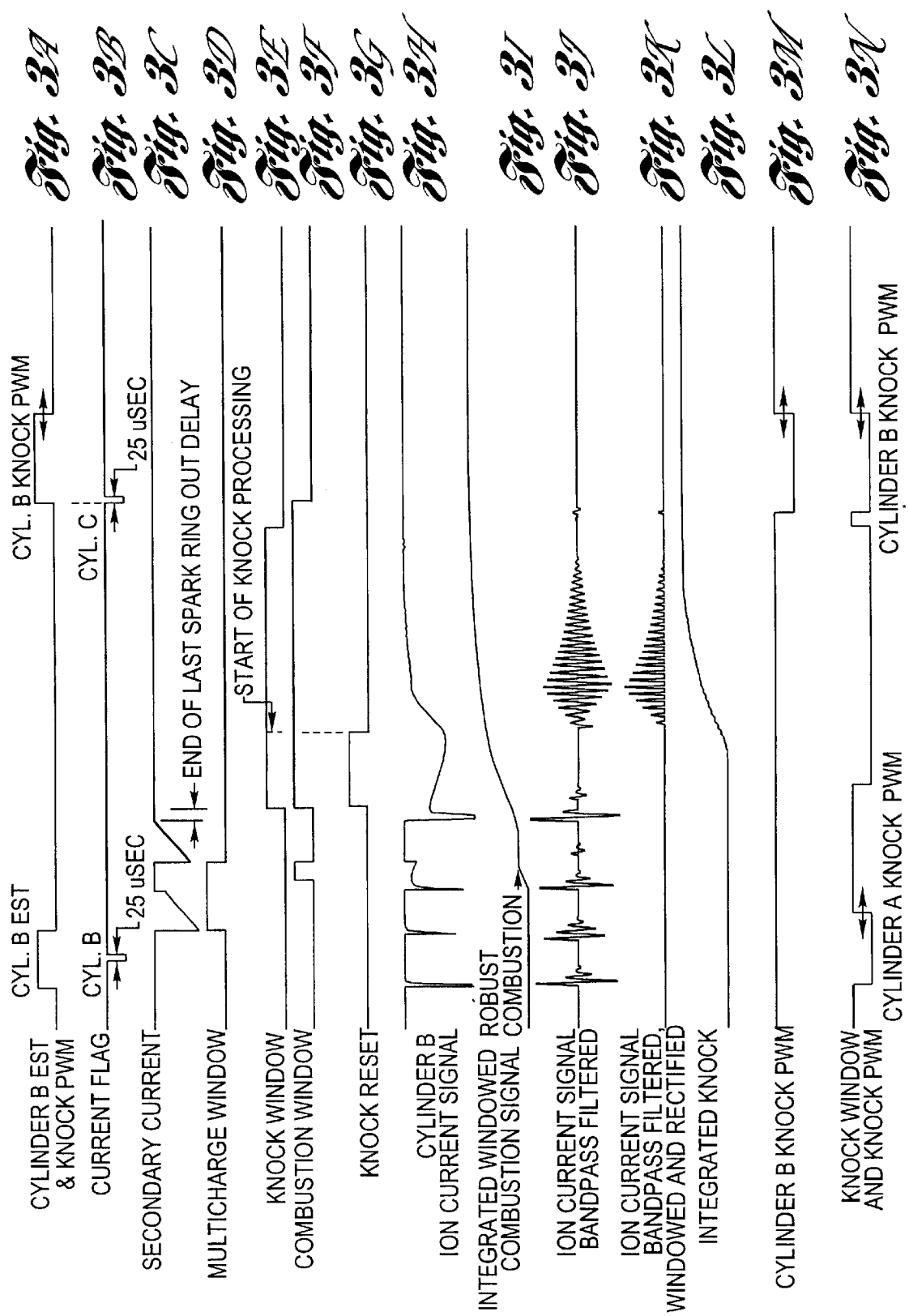
FIGS. 3A–3N are simplified timing diagrams showing various control and data signals for detecting and reporting knock according to the invention.

As shown in FIG. 3A, the EST signal is generated, for example, by control unit 20 in accordance with known strategies based on a plurality of engine operating parameters as well as other inputs. Dwell control generally involves the control of the timing of the initiation of the spark event (i.e., at a crankshaft position and degrees relative to a top dead center position of a piston in the cylinder) as well as a duration of the charging period. The asserted ignition control signal EST is the command to commence charging of the ignition coil for a spark event. De-asserting the EST signal is the command to initiate spark.

As shown in FIG. 3B, a current flag signal may be produced (a pulse) indicating that a predetermined level of primary current has been reached during a charging interval.

Referring to FIG. 3C, after charging, primary winding 22 is disconnected from ground, thereby interrupting the primary current $I_p$. It is well understood by those of ordinary skill in the art of ignition control that such interruption results in a relatively high voltage being immediately established across the secondary winding, due to the collapsing magnetic fields associated with the interruption of the primary current. The secondary voltage will continue to rise until reaching a breakdown voltage across electrodes 16, 14 of spark plug 12. Secondary current will thereafter discharge across the gap (i.e., spark current). The spark event, as is generally understood by those of ordinary skill in the art, is provided to ignite an air and fuel mixture introduced into the cylinder.

As shown in FIG. 3D, the present invention may be used in a configuration where repetitive spark is applied for a single ignition event (so-called "multicharge" arrangements). Multicharging may continue (i.e., the multicharge window may remain open) until a predetermined level of combustion is obtained. In particular, after sparking has occurred, ion current detection circuit 32 biases spark plug 12 to thereby produce an ion current $I_{ION}$ to the extent combustion has begun, which results in generation of an ion current signal 33, which is best shown in FIG. 3H. The ion current signal may be processed (e.g., integrated, as known) by a combustion monitor (not shown) or similar circuit during a combustion window, which is shown in FIG. 3F. The combustion window may "open" after a ring out delay following a spark and the dissipation of the secondary current, and "close" when the time for the next spark occurs (in the repetitive spark example). The resulting integrated ion current signal is shown in FIG. 3I. When the integrated ion current signal reaches a predetermined level indicative of robust combustion, multicharge operation may be discontinued, which is shown in FIG. 3D as with multicharge window closing, which disables circuitry in ignition circuitry 28 from producing any additional sparks beyond the last spark that will occur from the discharge of coil 10.

As shown in FIGS. 4A–4C, at a predetermined time designated t1, engine control unit 20 or alternatively ignition apparatus 10, as described above, produces a knock window signal KWI, which may be based only on the angular position of the crankshaft. However, in actuality, knock is unlikely to occur between times t1 and t2 since the last decreasing slope interval has not yet arrived. Slope detector 36 recognizes the positive slope (after a time Δ, which is exaggerated in the FIG. 4C) of the inverted ion current signal in FIG. 4A over the interval t1 to t2, and thus asserts the knock reset signal over the interval t1 to t2. The knock reset signal is shown in FIG. 4C. Since the knock reset signal suppresses determination of knock by knock detector 34, the knock window KWI is effectively foreshortened. Slope detector 36 further recognizes when the inverted ion current signal passes the inflection point (FIG. 4A) at time t2 and begins an extended negative slope over the interval t2 to t3. Thus, at time t2, slope detector 36 de-asserts the knock reset signal, as shown in FIG. 4C. Thus, the knock reset signal is operative to tailor the knock window, which is generated based on angular information, to a more accurate knock window based on the actual progression of the combustion in the cylinder, as shown by the ion current. This eliminates processing during times when knock is unlikely to occur, and which may result in mistaking "noise" for knock.

With reference to FIGS. 3J–3L, knock detector 34, in one embodiment, may be configured to process the ion current signal so that it is bandpass filtered by a bandpass filter/amplifier (not shown). The resulting signal is shown in FIG. 3J. Knock detector 34 may then be further configured to rectify the filtered ion current signal using a rectifier (also not shown). Knock detector 34, according to the invention, is then configured to "window" or gate the filtered, rectified ion current signal with the knock window, as modified by the knock reset signal. As shown in FIG. 3E, the start of knock processing is deferred relative to the "opening" of the knock window KWI. FIG. 3K shows in diagrammatic fashion that portion of the filtered, rectified ion current signal (i.e., the knock components) that is permitted to contribute to the determination of knock intensity. FIG. 3L shows one form of a knock intensity signal 38 represented as an analog, integrated signal.

FIG. 3M shows an alternate form for the knock intensity signal 38. FIG. 3M shows the knock intensity signal 38 in the form of a pulse width modulated (PWM) signal, wherein the duration of the pulse corresponds to the intensity of the knock. As shown in FIG. 3M, in the illustrated embodiment, the knock intensity PWM signal 38 has a fixed beginning time, which may be aligned with the closing of the combustion window (FIG. 3F), and a variable ending time, as designated by the double arrow-headed line through the low-to-high transition.

FIG. 3N shows an embodiment where the knock intensity signal 38, in the form of a PWM signal 38, is time division multiplexed on the same line as the knock window signal (KWI), for the case where the ECU 20 generates the knock window signal. This arrangement would eliminate the need for one line (namely, a separate knock intensity signal 38 line).

FIG. 3A shows a further embodiment of the present invention where the knock intensity signal is time division multiplexed on the same physical line as the EST signal provided by the ECU 20, as described above. This arrangement is preferred where the ignition apparatus 10 itself generates the knock window signal KWI via ignition circuitry 28, eliminating the need for a KWI line from the ECU 20, as well as separate KI line. In this preferred embodiment, only one physical line is needed for the exchange of the EST and knock intensity KI signals between the ECU and the ignition apparatus 10.

Figure 5:
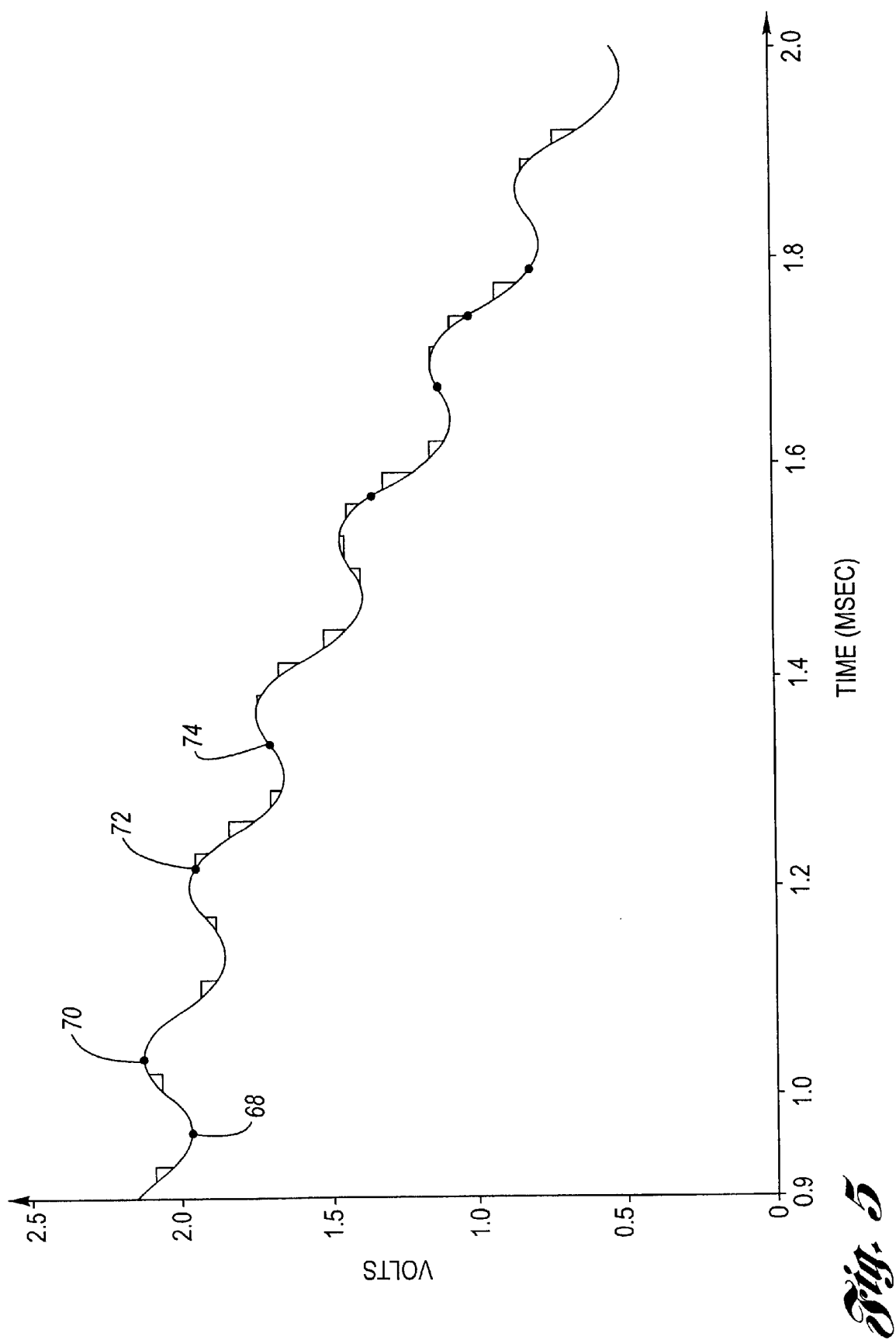
FIG. 5 is a timing diagram showing short-term transient tolerance of the slope detector of the present invention.

FIG. 5 shows, in greater detail, an excerpt of the negative slope portion of the inverted ion current signal. Another feature of the present invention is one that controls and accurately responds to transient periods of increased levels. In real world situations, while the overall voltage level is decreasing during the last portion of the inverted ion current waveform (i.e., that portion between times t2 and t3 in FIG. 4A), heavy knock could cause short times of level increases. FIG. 5 shows points 68, 70, 72 and 74. Note that even though there is an increase between points 68 and 70, the general slope of the inverted ion current signal in FIG. 5 is negative. According to the invention, a predetermined number of samples in a row would have to exhibit a positive slope (e.g., the number of stages in shift register 60) in order for the knock reset signal to be asserted by slope detector 36. Thus, both the cycle interval of the clock signal used in slope detector 36, as well as the number of stages in shift register 60, affect how brief instances of increased levels are "damped" so as to not cause the knock reset signal to be asserted. This feature enhances the robustness of the present invention when subjected to heavy knock conditions.

What is claimed is:

1. A method for detecting knock in a cylinder of an internal combustion engine comprising the step of determining knock when an ion current exhibits a predetermined slope indicative of a time period for knock to occur.

2. The method of claim 1 further comprising the step of:
generating an ion current signal corresponding to the ion current indicative of a level of combustion in the cylinder.

3. The method of claim 1 further comprising the step of:
asserting a knock reset signal;
de-asserting the knock reset signal when the ion current signal exhibits the slope indicative of the time period for knock to occur; and
generating a knock signal indicative of knock in the cylinder by processing the ion current signal during a knock window when the knock reset signal is de-asserted.

4. The method of claim 3 wherein said step of generating the knock signal includes the substeps of:
extracting components of the ion current signal indicative of knock;
integrating the extracted components.

5. The method of claim 4 wherein said extracting step includes the substeps of:
filtering the ion current signal; and
rectifying the filtered ion current signal.

6. The method of claim 3 wherein said step of producing the knock reset signal is performed by the substeps of:
establishing a clock signal having a-plurality of cycles;
sampling the ion current signal for each cycle of the clock signal; and
asserting the knock reset signal when the ion current signal exhibits the predetermined slope for a predetermined number of cycles.

7. The method of claim 6 wherein said step of producing the knock reset signal is performed when the predetermined number of cycles are consecutive.

8. The method of claim 6 wherein the step of asserting the knock reset signal is operative to disable processing of the ion current signal.

9. An apparatus for detecting knock in a cylinder of an internal combustion engine comprising:

an ion current detection circuit for producing an ion current signal indicative of a level of combustion in the cylinder;
a knock detector for generating a knock signal indicative of knock in the cylinder based on said ion current signal; and
a slope detector configured to enable said knock detector when said ion current signal exhibits a predetermined slope indicative of a time period for knock to occur.

10. The apparatus of claim 9 wherein said slope detector includes:
a sample and hold circuit responsive to a clock signal having a plurality of cycles for capturing a respective sampled level of said ion current signal for each cycle;
a comparator responsive to said ion current signal and said respective sampled levels for generating a slope indicative signal indicative of said predetermined slope;
a logic circuit responsive to said clock signal and said slope indicative signal configured to enable said knock detector.

11. The apparatus of claim 10 wherein said logic circuit includes:
a shift register having a predetermnined number of outputs corresponding to stages thereof, said shift register having a clock input responsive to said clock signal, said shift register further having a data input responsive to said slope indicative signal; and
an AND logic gate having a plurality of inputs respectively coupled to said outputs of said shift register, said AND logic gate having an output for asserting a knock reset signal operative to disable said knock detector, said knock reset signal, when de-asserted, being operative enable said knock detector to produce said knock signal indicative of knock.

12. The apparatus of claim 11 wherein said number of stages is selected a function of a frequency of said clock signal.

13. The apparatus of claim 9 further comprising a primary and secondary winding.

* * * * *